Aug. 31, 1965

K. W. KAMPERT ETAL

3,203,566

TRACTOR FORK LOADER

Filed Sept. 13, 1962

INVENTORS.
Keith W. Kampert
Richard F. Zimmerman

By

Noel S. Artman
Atty.

INVENTORS.
Keith W. Kampert
Richard J. Zimmerman

Aug. 31, 1965   K. W. KAMPERT ETAL   3,203,566
TRACTOR FORK LOADER
Filed Sept. 13, 1962   5 Sheets-Sheet 3

INVENTORS.
Keith W. Kampert
Richard F. Zimmerman

Aug. 31, 1965 K. W. KAMPERT ETAL 3,203,566
TRACTOR FORK LOADER
Filed Sept. 13, 1962 5 Sheets-Sheet 5

INVENTORS.
Keith W. Kampert
Richard F. Zimmerman

United States Patent Office 3,203,566
Patented Aug. 31, 1965

3,203,566
TRACTOR FORK LOADER
Keith W. Kampert, Libertyville, and Richard F. Zimmerman, Waukegan, Ill., assignors to The Frank G. Hough Co., a corporation of Illinois
Filed Sept. 13, 1962, Ser. No. 223,439
12 Claims. (Cl. 214—147)

This invention relates generally to tractor loaders, and more particularly to front end fork loaders in combination with a hold-down or grab arm device wherein the fork loader can be operated in the loading, carrying and unloading positions in combination with the operative positions of the hold-down device such as the load releasing position and the load securing position.

It is an object of the present invention to provide a fork loader of simple construction that includes a pair of fork members which can be secured to a carrier member pivotally connected to the forward end of a boom means and a linkage means, both means being also pivotally connected on the forward end of the tractor. Through selective operation of the linkage means and the boom means the fork loader can be operated in the loading position, unloading position and the carrying or transport position.

Another object of the present invention is to provide a fork loader which includes a pair of fork members secured to a carrier member pivotally connected to the forward end of the boom means and the extensible linkage means, both means extending forwardly of the tractor loader and pivotally connected thereto. Further, the pair of fork members each include an upper extension portion extending upwardly and forwardly of the carrier member to increase the load carrying capacity of the fork loader.

Further, another object of this invention is to provide a fork loader which includes a pair of fork members secured to a carrier member pivotally connected to the forward ends of the extensible linkage means and the boom means, both means extending forwardly of the tractor loader and pivotally connected thereto. The fork members include an upper extension portion extending upwardly and forwardly of the carrier member to increase the load carrying capacity of the fork members and further to provide the upper extension portion to be disconnectable from the fork members.

It is another object of this invention to provide a fork loader which includes a pair of fork members secured to a carrier member pivotally connected to the forward ends of an extensible linkage means and boom means, both means extending forwardly of a tractor loader and pivotally connected thereto. The pair of fork members include an upper extension portion extending upwardly and forwardly to increase the load carrying capacity of the fork loader and further includes a pivotal connection at the upper free end thereof to pivotally connect thereto a hold-down or grab arm device. The grab arm device can be selectively operable from a load releasing position to a load securing position irrespective of the selective operable position of the fork members and carrier, namely the loading position, unloading position and transport position. Further, the grab arm device or hold-down device can be selectively connected or disconnected to the upper extension pivotal connection to further increase the load carrying capacity of the fork loader.

Still another object of this invention is to provide a fork loader including a pair of fork members, upper extension portions and pivotally connected grab arms that can be of a particular shape to handle a particular load such as diametrical pipe.

Another object of this invention is to provide a fork loader which includes a pair of fork members rigidly secured or selectively transversely adjustably secured to a carrier member pivotally connected to the forward ends of an extensible linkage means and boom means, both means extending forwardly of a tractor loader and pivotally connected thereto. The fork members are secured for selective transverse adjustment by manual locking or clamping and release means therefor. Further, one of the manual means of one of the fork loaders provides selective transverse adjustment relative to the carrier member even though the upper extension portion is connected thereto and further even if the grab arm device is connected to the upper extension portion. Thus the selective manual transverse adjustment of the pair of fork members increases the load carrying capacity for the fork loader for the particular type of load being handled along with the aforementioned increased load carrying capacity provided by the upper extension portion and the grab arm or hold-down device.

Other objects and features of the present invention will be apparent upon a perusal of the following specification and drawings of which.

The present embodiment is the preferred embodiment, but it is to be understood that changes can be made in the present embodiment by one skilled in the art without departing from the spirit and scope of the present invention.

For a general description of the present invention reference is made to the drawings. A four-wheeled tractor loader has a fork loader that includes a pair of fork members secured to a carrier member pivotally connected to the forward end of the boom means and the extensible linkage means, both means extending forwardly of the tractor loader's operator station and pivotally connected to the tractor loader forward portion. The pair of fork members at the upper end thereof further include extension portions extending upwardly and forwardly of the carrier and at the upper end of the extension portion a grab arm or hold-down device is pivotally connected thereto. The fork loader is selectively operable through selective operation of the boom means and the extensible linkage means so that the pair of fork members are in a loading position, carrying or transport position and unloading position. The grab arm is selectively pivotally operable from a load releasing position to a load securing position irrespective of the selective operation of the boom means and the extensible linkage means. One of the fork loaders provides a pair of fork members that are secured at the upper end thereof to a securing means on the carrier permitting transverse adjustment of the fork members. At the lower end of one portion of the fork members, a plurality of openings on the carrier member permit insertion and assembly of a selective clamping means to rigidly secure each of the fork members in a desired transverse adjustment relative to the vertical center line of the carrier. The one fork loader further includes a selectively connectable upper extension portion that somewhat overlaps the upper end of the fork member upon securement to the carrier members. The upper extension is secured to the securing means to the upper end of the fork member on the carrier. The carrier also provides another separate securing means positioned below the first securing means for rigidly securing the upper extension portion to the carrier. The upper free end of the extension portion has pivotally connected thereto a grab arm that is selectively operable from a load releasing position to a load securing position by a double-acting actuator pivotally connected at one end to the upper extension portion and at the other end to the grab arm. Without the upper extension portion and the grab arm the pair of fork members can be independently transversely adjustable relative to the vertical center line of the carrier member for the particular load being handled. If the load carrying capacity of the fork loader is to be further increased, the upper extension portion for each fork member can be secured to the two securing means provided on the carrier member, and if the load carrying capacity to be handled by the fork loader is to be further increased, the grab arm can be pivotally connected to the upper free end of the upper extension along with the pivotal connection of the actuator at the ends thereof to the upper extension portion and the grab arm.

A second fork loader provides a pair of fork members of one-piece construction that includes the upper extension portion rigidly secured to the outer transverse ends of the carrier member in a suitable manner such as welding. The upper free end of each fork member has pivotally connected thereto a grab arm selectively pivotally operable by a double-acting actuator pivotally connected at one end to the fork member and at the other end to the grab arm. The forward end of the grab arm includes a pivotally connected arcuate shoe for the particular load being handled. Opposite the arcuate surface of the arcuate member, the fork member includes an arcuate surface portion of corresponding diametrical size. The carrier member is substantially the same as the carrier member is in the first-mentioned fork loader and is pivotally connected to the boom means and the extensible linkage means. The second fork loader then can be selectively operable in the same manner as the first-mentioned fork loader.

The third and last fork loader includes a pair of fork members secured at the upper end thereof of one portion of the fork member to the carrier member to provide selective transverse adjustment of each fork member relative to the center line of the carrier member. A locking means consisting of a plurality of uniformly spaced slots are positioned immediately adjacent the securing means on the carrier member. The securing means on the carrier member further includes a selectively releasable and rotatable projection means thereon for engagement with the slots on the locking means to thereby selectively lock the desired transverse adjustment of each fork member. Further, the upper end of one portion on each fork member has fixedly secured thereto an extension portion in such a manner as welding. Other than the fixed connection of the extension portion to each fork member, the extension portion, grab arm and double-acting actuator is of the same construction as the first-mentioned fork loader. Finally the carrier member is pivotally connected to the boom means and extensible linkage means so that the fork loader can be selectively operable in the same manner as the aforementioned fork loaders.

Turning to a detailed description of the present invention, continued reference is made to the drawings. For the purpose of brevity, a complete tractor loader vehicle is not shown in FIG. 1, but it is to be understood that the present embodiments of the invention are applied to a tractor loader vehicle having an engine compartment in the rear portion of the vehicle positioned over the rear wheel axle. As specifically shown in FIG. 1, the tractor loader 10 comprises an operator's station 11 above the frame 12 supported above the ground by the front axle 13 on wheels 14. A pair of duplicate boom arms 15, one being shown, are pivotally connected at one end through a pivotal connection 16 to the tractor 10 forwardly of the operator's compartment 11 and at the other end of the boom arms extends forwardly to a pivotal connection 17 for connecting a fork loader such as the fork loader 18 to the forward end thereof. A double-acting hydraulic ram 20 including cylinder 21 and piston rod portion 22 operates to raise and lower the elevation of the boom arms 15 from the ground-engaging position shown to the raised position shown in dotted lines in FIG. 1. The double-acting ram 20 is pivotally connected at one end to the pivotal connection 25 on the downwardly extending portion 24 of the frame 12 and at the other end to the pivotal connection 23 intermediate the ends of the boom arms 15. An extensible linkage means 26 includes a double-acting actuator 27 pivotally connected at one end to the pivotal connection 28 forwardly of the operator's station 11 on the tractor loader 10 and at the other end to the pivotal connection 30 on the cross member 31 pivotally mounted intermediate its ends on a cross shaft 32 connected to the intermediate ends of the boom arms 15. A link 34 is pivotally connected at one end through the pivotal connection 33 on the lower end of the cross member 31 and the link 34 at the other or forward end through the pivotal connection 35 is pivotally connected to the fork loader 18. Selective operation of the double-acting actuator 27 on the linkage means 26 pivotally positions the fork loader 18 relative to the forward pivotal connection 17 of the boom arms 15. Thus in FIG. 1 partial extension of the double-acting actuator 27 positions the fork loader 18 in the ground-engaging position and, as shown in dotted lines, upon raising the boom arms 15 by the ram 20, the double-acting actuator 27 is in substantially completely retracted position thereby positioning the fork loader 18 in a discharging position. If further details are desired of the tractor loader vehicle 10, not shown in FIG. 1, reference is hereby drawn to the U.S. Patent 2,986,292 granted to Kampert et al. on May 30, 1961 entitled "Bucket Operating Means For Tractor Loaders."

Figure 1:
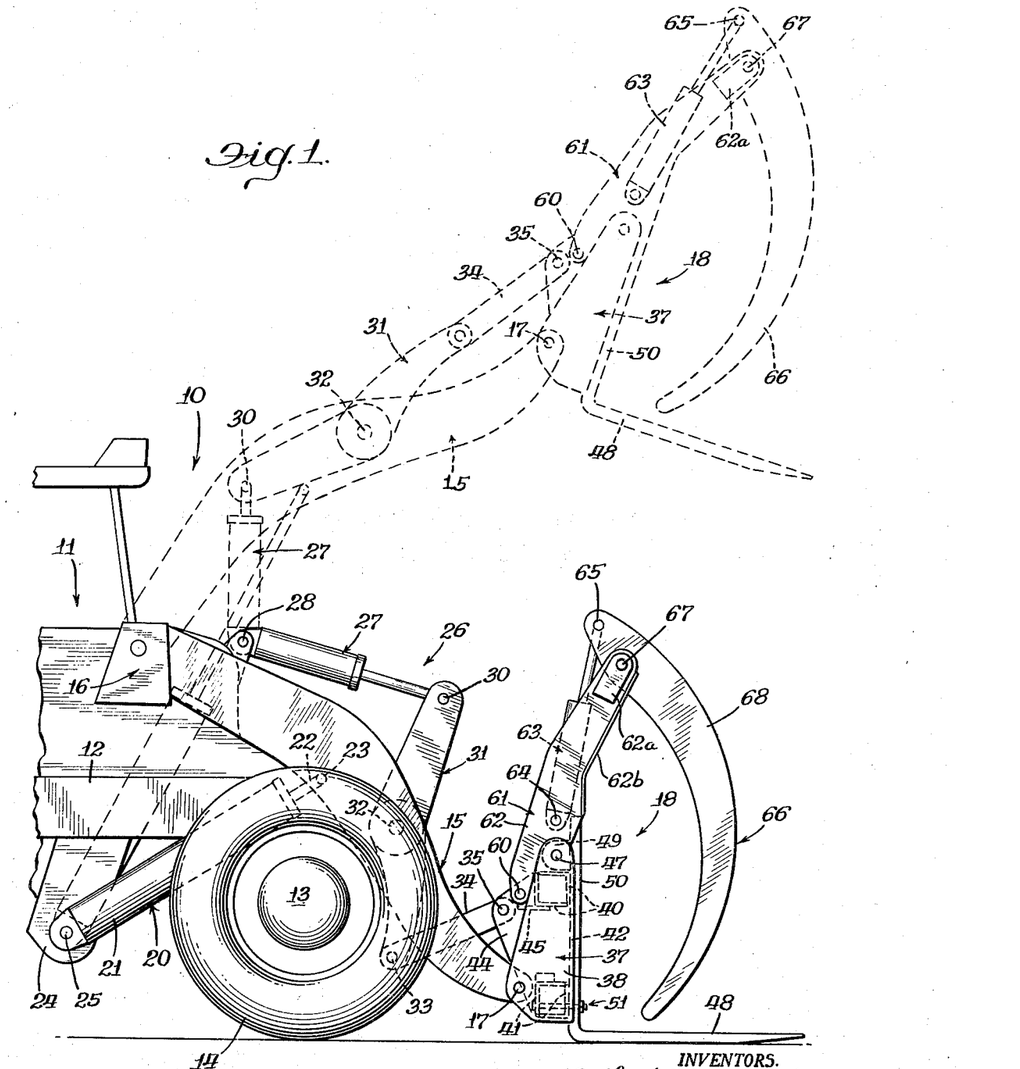
FIG. 1 is an elevational view of a fork loader of the subject invention mounted on the front end of a four-wheeled tractor.
Figure 1A:
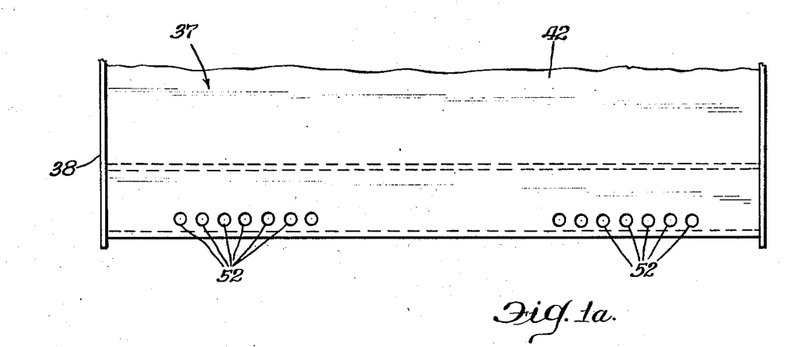
FIG. 1a is an enlarged fragmentary view of one portion of the carrier member.
Figure 2:
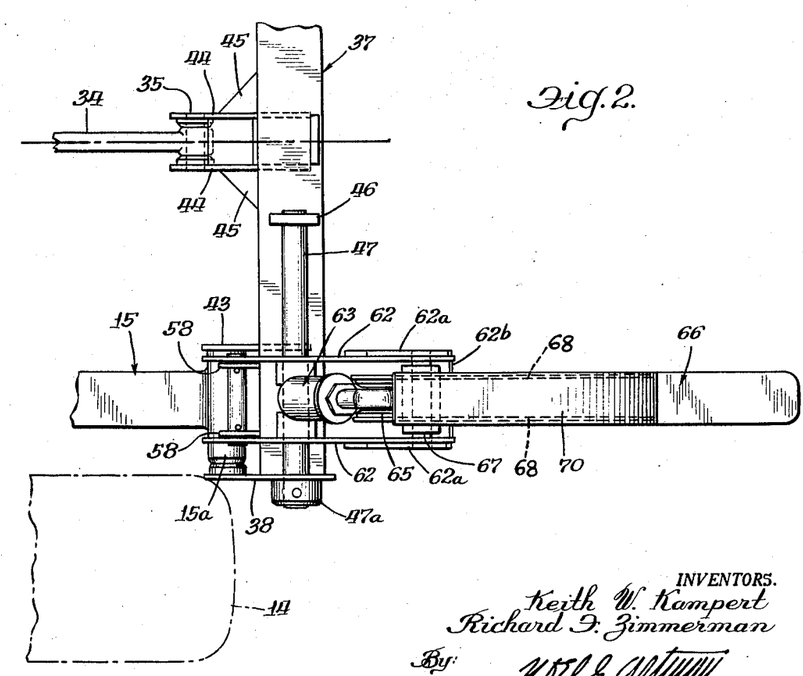
FIG. 2 is a top plan view of one side of the fork loader.
Figure 3:
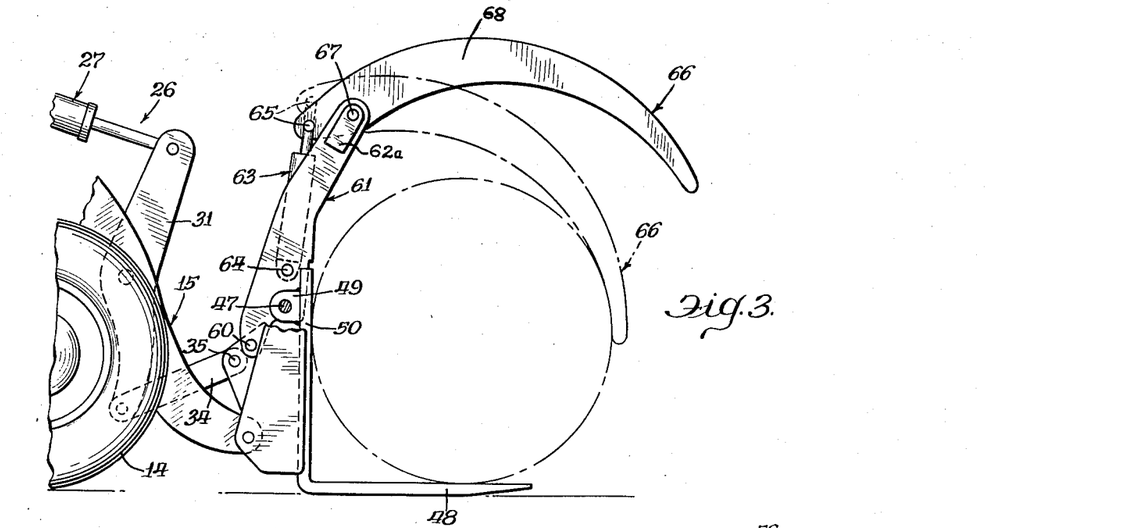
FIG. 3 is an enlarged elevational view, partially fragmentary, of the fork loader of FIG. 1 illustrating further details and operative positions.

Turning now to FIGS. 1 to 3, the fork loader 18 comprises a carrier member 37 having a pair of side plates 38 interconnected by a transverse extending support member. Specifically the transverse extending member comprises upper and lower box-shaped members such that the upper box member includes a pair of assembled angle members 40 and similarly the lower box member includes a pair of assembled angle members 41. A plate or expanded screen member 42 is secured to the upper and lower members 40 and 41 and to the side members 38 in a suitable manner such as welding. The rearward portion of the side plate member 38 is somewhat triangularly shaped to define a rearwardly extending flange portion. Another flange portion 43 comprises a plate member also extending rearwardly, but spaced in length a sufficient distance from the plate member 38 to equal the length of the pin means 15a on the forward end of the boom arms 15, as shown in FIG. 2. It is to be noted here that only one side of the carrier member 37 is shown in FIG. 2 and that the other side of the center line is symmetrical thereto. Thus the forward end of the boom arms 15, through the pin means 15a, are pivotally connected to the carrier 37 through the rearwardly extending flange members 38 and 43.

Another flange member extending rearwardly comprising spaced-apart plate members 44 is positioned on the transverse center line of the carrier member 37 and provides the pivotal connection 35 of the forward extending link 34 of the linkage means 26. Reinforcing plates 45, triangularly shaped, provide additional reinforcement of the flange plate members 44.

Each of the fork members comprises a horizontal portion 48 connected to an upper extending vertical portion 50 with the upper end of the portion 50 having rearward extending ears 49 for connection to a securing means on the carrier member 37. The securing means includes an upper portion of the side plate 38 having an opening therethrough and an upwardly extending ear 46 including a corresponding opening transversely spaced from the side plate 38 upper portion and secured along the upper member 40. A pin 47 is passed through the openings in the side plate 37 and ear 46 and the corresponding openings on the fork member ears 49 to secure the upper end of the fork member portion 50. The lower end of the fork member portion 50 is clampingly secured to the lower carrier member 41 which includes a plurality of circular openings 52 for assembly of the clamping or fastening means 51 best shown in FIGS. 3a and 3b.

Figure 3A:
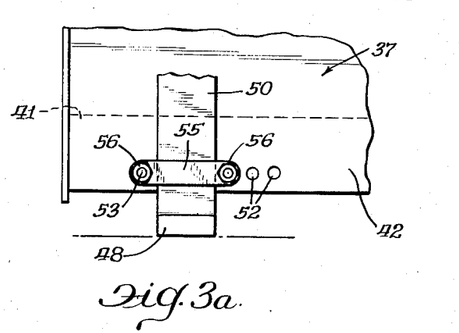
FIG. 3a is an enlarged fragmentary view illustrating the clamping assembly on the carrier member for the selectively transversely adjustable fork member.
Figure 3B:
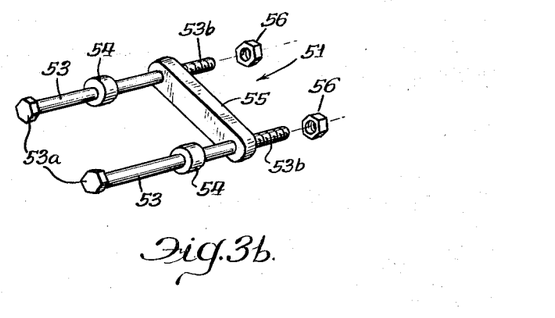
FIG. 3b is an exploded view illustrating the operative association and alignment of parts for the clamping assembly.

Specifically, the clamping or fastener assembly 51 comprises a pair of bolts 53 having head portions 53a and threaded portions 53b at the other end to engage a pair of spacers 54 and a strap member 55 and a pair of assembling nuts 56. The spacers 54 should be of such a length corresponding to the thickness of the fork member portion 50 but yet permitting clamping or locking action of the assembly 51. The strap member 55 should be of a length greater than the width of the fork member portion 50 so as to clampingly engage the outer surface of the fork member portion 50. Thus each fork member can be transversely adjusted relative to the center line along the length of the securing pin means 47 at the upper end of the fork member portion 50 and at the lower end thereof lockingly or clampingly secured by the fastener assembly 51 engaging the openings 52 in the member 41 and the strap member 55 of the fastener assembly 51 engaging the outer surface of the fork member portion 50.

In order to increase the load handling capacity of the fork members an upper extension portion that can be selectively connected to the carrier 37 is provided. Specifically, a second securing means positioned and spaced below the first securing means, namely rearwardly extending spaced-apart flange portions 58, best shown in FIG. 2, provide assembly through openings therein of a pin 60. An upper extension portion 61 having a wide open V-shape provides a pair of spaced-apart plate members 62 assembled to a front plate 62b in a suitable manner such as welding. The lower end of the spaced-apart plate members 62 includes spaced-apart openings such that one of the openings corresponds to the pin 47 for connection thereto and the other lowermost opening corresponds to the pin 60 for the connection thereto. Thus the upper extension portion 61 somewhat overlappingly engages the upper end of the fork member portion 50 as shown in FIGS. 1 and 3 when rigidly secured to the carrier member 37 by the two securing means provided by the pin 47 and the pin 60. The pin 60 is lockingly engaged through locking pins not indicated immediately adjacent the flange portions 58.

To further increase the load handling capacity of the fork loader 18 a grab arm 66 is pivotally connected to the outer free end of the extension arm 61. Specifically, the outer free end of the plates 62 has additional reinforcing plate members 62a secured thereto to reinforce the pivotal connection 67 including the conventional pin and bearing means for pivotally connecting the grab arm 66 intermediate the ends thereof to the extension portion 61. The grab arm 66 comprises a pair of spaced-apart plate members 68 connected together by a top curved plate member 68' as shown in FIGURE 2, the said grab arm in side elevation having a C-shaped configuration. The rearward end of the grab arm 66 and intermediate the ends of the upper extension portion 62 provide pivotal connections for the opposite ends of the double-acting actuator 63 having pivotally connectable ends 64 and 65. The double-acting actuator 63 can be selectively operable to position the grab arm 66 in a load releasing position or a load securing position as shown in phantom lines in FIG. 3. A further extended position of the double-acting actuator 63 is shown in FIG. 1 defining a further extreme load securing position when the fork loader 18 is in the ground-engaging position or in the elevated position shown in dotted lines.

Figure 4:
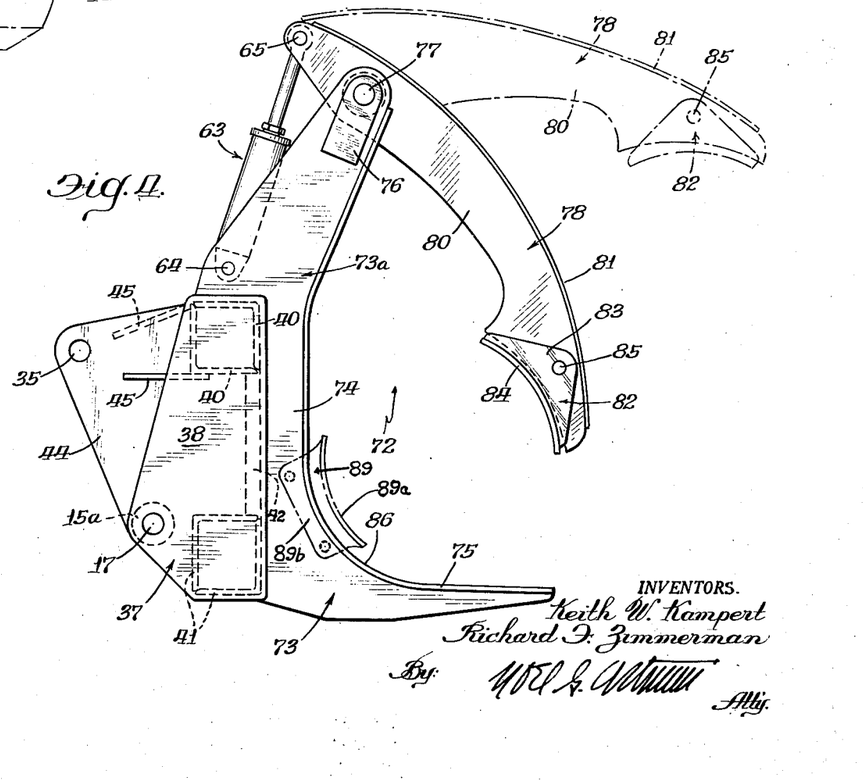
FIG. 4 is an elevational view of a first modification.
Figure 5:
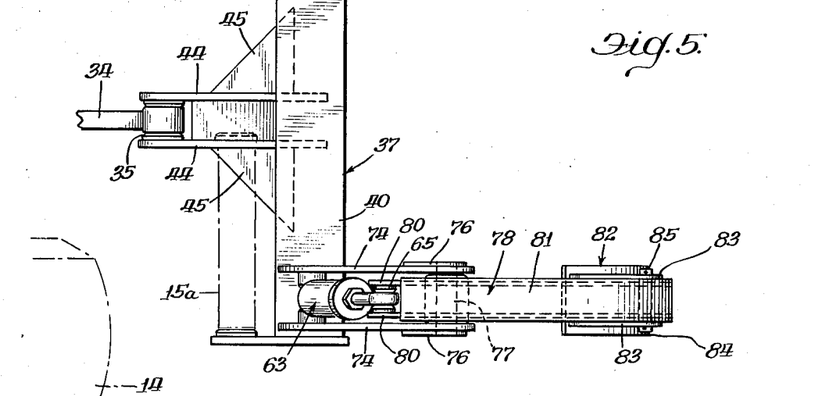
FIG. 5 is a top plan view of one side of the first modified fork loader.

Referring now to FIGS. 4 and 5, the first modification of the fork loader will now be set forth. Unless otherwise specified, the carrier 37 is of the same identical construction as the carrier 37 in FIGS. 1 through 3 of the fork loader 18. The modified fork loader 72 comprises a pair of fork members 73 which include a pair of spaced-apart plate members 74 assembled to a front plate 75. The lower portion of the back edge of the assembled plates 74 are secured to the outer transverse ends of the carrier 37 in a suitable manner such as by welding as shown in FIG. 5. It is to be noted here in FIG. 5 only one side of the carrier 37 is illustrated since the other side thereof is symmetrical thereto. The upper portion 73a of the fork member 73 comprises an upper extension portion extending upwardly and forwardly of the top edge of the carrier 37 to further increase the load handling capacity of the fork members 73. Thus the fork members 73 are somewhat L-shaped and are of one-piece construction.

The outer upper end of the upper extension portion 73a provides a reinforcing plate member 76 on each plate member 74 for the pivotal connection of a grab arm 78 through the conventional pin means passed through the openings in the plate members 74 and 76. The grab arm 78 comprises a pair of plate members 80 assembled in a parallel spaced-apart manner by the top plate member 81 secured thereto in a suitable manner such as by welding. The grab arm 78 intermediate the ends thereof is connected to the pivotal connection 77 through the aforementioned pin means passing through the openings also in the plate members 80 intermediate the ends thereof. A double-acting actuator of similar construction as the double-acting actuator 63 used in the first fork loader 18 is pivotally connected at one of its ends 64 to the extension portion 73a on the fork member plates 74 and the other of its ends 65 to one end of the grab arm 78. The other end of the grab arm 78 provides an arcuate shoe 82 pivotally connected thereto. Specifically, the arcuate shoe comprises a pair of spaced-apart plate members 83, triangularly shaped, and further including an arcuate shoe plate member 84 secured to the longer and arcuate edges of the triangularly shaped members 83. At the apex of the triangularly shaped members 83 an opening is provided for the pivotal connection 85 to the other end of the grab arm 78. Opposite the arcuate surface of the shoe 84 a corresponding arcuate surface 86 is provided on the top plate member 75 of each fork member 73. The arcuate surface portions on shoe 84 and arcuate portion 86 on top plate member 75 are of substantially the same diameter. It is to be noted here in certain instances, the arcuate surface 86 is not suitable for the particular load size being handled. Then as further shown in phantom lines in FIG. 4 an adapter 89 can be inserted and secured to overlappingly engage each fork member 73 adjacent the arcuate surface 86. Specifically, the adapter 89 comprises an arcuate shaped member 89a having an arcuate load engaging surface assembled in a suitable manner to a pair of flange members 89b (one shown).

Then the flange members 89b are secured to the plate members 74 by a conventional fastener assembly through corresponding openings (not indicated) in the plate members 74 and flange members 89b. Thus in the load securing position shown in FIG. 4 a particular load can be handled such as a large sized pipe. As shown in phantom lines in FIG. 4, the grab arm 78 is positioned in a load releasing position. It is to be further noted here that the forward link 34 of the linkage means 26 in FIG. 1 is positioned away from the center line of the carrier member 37. In the first modification a pair of forward links 34 are connected to the carrier 37 and the lever member 31 whereas in the first fork loader 18 (FIG. 2) only one forward link member 34 was pivotally connected to the lever member 31 and the carrier 37. It is to be understood, depending upon the load application of the fork loader carrier 37, that one or two forward links 34 of the linkage 26 can be pivotally connected to the carrier 37 and member 31.

Figure 6:
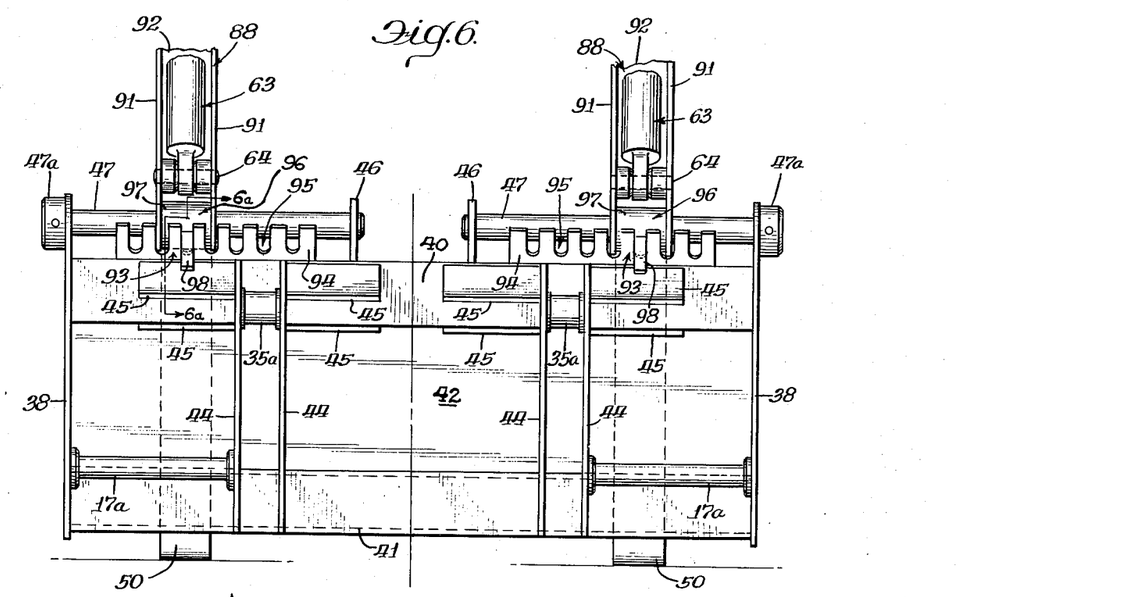
FIG. 6 is a rear elevational view, partially fragmentary, of a second modification.
Figure 6A:
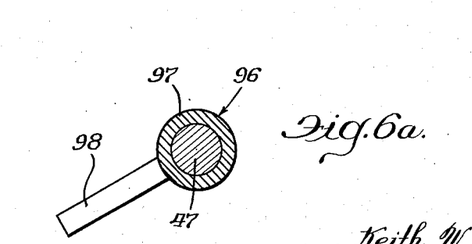
FIG. 6a is a cross-sectional view along section line 6a—6a of FIGURE 6 illustrating details of the selectively operable projection means.
Figures 7, 8:
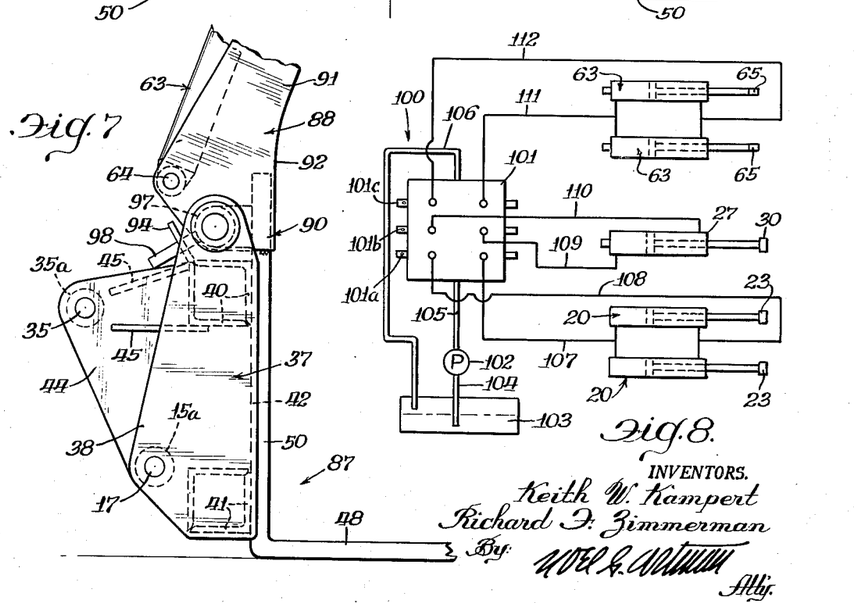
FIG. 7 is an elevational view, partially fragmentary, of the second modified fork loader.
FIG. 8 is a schematic view of a hydraulic circuit used to selectively operate the fork loader.

Turning now to the second and last modification of the fork loader as shown in FIGS. 6 to 7. The carrier 37 is of the same construction as used in the first fork loader 18 unless otherwise specified. The carrier 37 in FIG. 6 shows the pin means 17a and 35a of the boom means 15 and the link 34 of their respective pivotal connections 17 and 35. The fork loader 87 includes the same fork member portions 48 and 50 as aforedescribed in FIGS. 1 to 3, but instead has secured the upper extension portion 88 to the upper end of the upper fork portion 50 by a weldment 90. The upper extension portion 88 comprises a pair of plate members 91 spaced apart in a parallel manner and assembled to a front plate member 92 in a suitable manner such as welding. Although only a fragmentary portion of the upper extension portion 88 is shown in FIGS. 6 to 7, it is to be understood that the upper extension portion 88 is of the same design as the upper extension portion 61 other than the weldable connection 90. It should be further now apparent that the load handling capacity of the fork loader 87 although initially increased by the upper extension portion 88 can be further increased by pivotally connecting the grab arm 66 to the outer end of the upper extension portion 88 identical to the outer end of the upper extension portion 61. The fork member portions 48 and 50 along with the upper extension portion 48 can be selectively adjustable transversely on either side of the vertical center line of the carrier member 37. Specifically, the upper extension portion 88 at the lower end thereof provides an opening through the plate members 91 for securement to the pin means 47. Within the plate members 91 and coaxial with the pin openings therethrough a selectively operable projection means 96 is provided. A locking means 93 operatively associated with the projection means 96 comprises a plate member 94 secured to the upper carrier member 40 at an angle extending upwardly and rearwardly. The plate member 94 is of a length lesser than the length between the ear member 46 and side members 38. Further, the plate member 94 comprises a plurality of uniformly spaced-apart U-shaped slots such as shown in FIG. 6. The selectively operable projection means 96 includes a tubular member 97 bearingly engaging the pin means 47 such as shown in FIG. 6a and further includes a pawl member 98 extending radially outward from the tubular member 97. Thus the projection means 96 can be operated by the operator to be released and then engaged from the U-shaped slots 95 to selectively transversely adjust the fork member portions 48 and 50 of the fork loader independently of each other relative to the vertical center line of the carrier 37. It should now be readily apparent that the fork loader 87 can be selectively transversely adjusted for the particular load being handled and further the load handling capacity of the fork loader can be further increased by pivotally connecting the grab arm 66 previously discussed in FIG. 1.

To provide selective operation of the fork loaders 18, 72 and 87 aforedescribed a hydraulic circuit 100, as shown in FIG. 8, will now be set forth below. Specifically, the hydraulic circuit 100 comprises a three valve spool control valve 101, pump 102 and reservoir 103 interconnected by a suction conduit 104, a supply conduit 105 and a return conduit 106. The aforedescribed double-acting actuators 29, 27 and 63 are each separately connected to each valve spool 101a, 101b and 101c. The pair of ram actuators 29 for operation of the boom arms of the boom means 15 are connected by conduits 107 and 108 to the ports on control valve 101 associated with the valve spool 101a; similarly the linkage means actuator 27 is connected by conduits 109 and 110 to the ports on the control valve 101 associated with the valve spool 101b; and lastly the pair of actuators 63 associated with the fork loader grab arms are connected by conduits 111 and 112 to the ports associated with the valve spool 101c. It is to be further understood that the preferred form of the control valve 101 is of the open center type and that in one operative position of the valve spools the actuators 29, 27 and 63 are extended and in another operative position they are retracted.

In view of the foregoing described details of the fork loaders 18, 72 and 87, the operation of these fork loaders will now be set forth below. Considering the fork loader 18, the operator can selectively operate the control valve 101 so that the ram actuators 29 can be extended to raise the boom means 15 from the load engaging position in FIG. 1 to the load carrying position shown in dotted lines therein. Then the operator can further selectively operate the linkage means actuator 27 for retraction thereof so that the attitude of the carrier member 37 is changed from the vertical or load engaging position shown in FIG. 1 to the forward tilted position such as shown in invisible lines in FIG. 1. As aforementioned, the load handling capacity of the fork loader 18 can be first increased by connecting the upper extension portion 61 to the carrier member 37, and again further increased by pivotally connecting the grab arm to the upper end of the upper extension portion 61. Then the pair of double-acting actuators 63 can be selectively operated by the operator through the selective position of the valve spool 101c for the desired position of the grab arm 66. Thus as shown in FIG. 1, the double-acting actuators 63 can be extended to the load securing position and further maintained in the load securing position of the grab arm 66 as the pair of double-acting rams 29 are extended to raise the boom means 15 and the linkage means actuator 27 is retracted for forward tilting of the carrier member 37. Referring to FIG. 3, a large load is secured by the grab arm 66 shown in phantom lines. Thus the load securing position of the grab arm 66 upon extension of the pair of actuators 63 is dependent upon the size of the load being carried. Upon retraction of the double-acting actuators 63 by selective operation of the valve spool 101c, the grab arm 66 is positioned in the load releasing position as shown in FIG. 3 in solid lines. It is to be further noted that the opposite ends of the actuators 63 are each parallel connected to the conduits 111 and 112. The purpose of the parallel connection at opposite ends is to provide independent adjustment of the actuators 63 in the event of an uneven load upon extension of the actuators 63 to pivotally move the grab arms 66 to the load securing position.

Considering the next fork loader 72 as shown in FIGS. 4 and 5, the actuators 29, 27 and 63 operate in a similar manner as with the first fork loader 18 and therefore the operation thereof should be apparent to those skilled in the art. As noted before, the fork loader 72 is for a particular load such as large sized pipe. Similarly, the last fork loader 87 other than the different manual transverse adjustment of the fork members uses the same actuators 29, 27 and 63 which operate in a similar manner as the described operation of the first fork loader 18. Although the operation of the actuators 20, 27 and 63 have been described in connection with certain operative positions of the boom means 15, carrier 37 and the grab arms 66 or 78, the described operating positions therewith are not to be considered limited thereto.

Having described the invention, what is desired to be protected and claimed by Letters Patent is:

1. In a tractor loader including boom means and linkage means pivotally connected thereto and extending forwardly of said tractor loader, a load handling device comprising:
   (a) a carrier providing a pair of side members connected in spaced-apart relation by a transverse extending member,
   (b) said carrier pivotally connected to said linkage means and to said boom means,
   (c) said carrier including securing means,
   (d) a pair of fork members, one portion of said fork members connected to said securing means in a transverse spaced-apart relation,
   (e) a locking means and a releasable projection means to selectively engage said locking means,
   (f) one portion of said fork members and said carrier including said locking means and said projection means,
   (g) each of said fork members being independently transversely adjustable on said securing means during selective engagement of said releasable projection means and said locking means,
   (h) said one portion further providing an extension portion extending upwardly and forwardly of said carrier,
   (i) a grab arm pivotally connected intermediate the ends thereof to said extension portion;
   (j) separate motor means connected to said grab arm and said fork member, and to said boom means and said tractor loader;
   (k) said linkage means further including separate motor means;
   (l) said motor means being selectively operable to raise and lower said boom means, to extend and retract said linkage means to pivotally move said device about said boom means from a load engaging position to a load carrying position and to a load discharging position, and to pivotally move said grab arm about said extension portion from a load securing position to a load releasing position.

2. In a tractor loader including boom means and linkage means pivotally connected thereto and extending forwardly of said tractor loader, a load handling device comprising:
   (a) a carrier providing a pair of side members connected in spaced-apart relation by a transverse extending member,
   (b) said carrier pivotally connected to said linkage means and to said boom means,
   (c) said carrier including securing means,
   (d) a pair of fork members, one portion of said fork members connected to said securing means in a transverse spaced-apart relation,
   (e) a locking means and a releasable projection means to selectively engage said locking means,
   (f) one portion of said fork members and said carrier including said locking means and said projection means,
   (g) each of said fork members being independently transversely adjustable on said securing means during selective engagement of said releasable projection means and said locking means,
   (h) said one portion further providing a removable extension portion extending upwardly and forwardly of said carrier,
   (i) separate motor means connected to said boom means and to said tractor loader;
   (j) said linkage means further including separate motor means;
   (k) said motor means being selectively operable to raise and lower said boom means, to extend and retract said linkage means to pivotally move said device about said boom means from a load engaging position to a load carrying position and to a load discharging position.

3. In a tractor loader including boom means and linkage means pivotally connected thereto and extending forwardly of said tractor loader, a load handling device comprising:
   (a) a carrier providing a pair of side members connected in spaced-apart relation by a transverse extending member,
   (b) said carrier pivotally connected to said linkage means and to said boom means,
   (c) said carrier including securing means,
   (d) a plurality of locking means provided on said carrier,
   (e) a pair of fork members,
   (f) a releasable rotatable projection means to selectively engage one of said locking means,
   (g) one portion of said fork members including said projection means coaxially secured to said securing means,
   (h) each of said fork members being independently transversely adjustable on said securing means during selective engagement of said releasable rotatable projection means and said locking means,
   (i) said one portion further providing an extension portion extending upwardly and forwardly of said carrier,
   (j) a grab arm pivotally connected intermediate the ends thereof to said extension portion;
   (k) separate motor means connected to said grab arm and said fork member, and to said boom means and to said tractor loader;
   (l) said linkage means further including separate motor means;
   (m) said motor means being selectively operable to raise and lower said boom means, to extend and retract said linkage means to pivotally move said device about said boom means from a load engaging position to a load carrying position and to a load discharging position, and to pivotally move said grab arm about said extension portion from a load securing position to a load releasing position.

4. In a tractor loader including boom means and linkage means pivotally connected thereto and extending forwardly of said tractor loader, a load handling device comprising:
   (a) a carrier providing a pair of side members connected in spaced-apart relation by a transverse extending member,
   (b) said carrier pivotally connected to said linkage means and to said boom means,
   (c) said carrier including securing means,
   (d) a plurality of locking means provided on said carrier,
   (e) a pair of fork members,
   (f) a releasable rotatable projection means to selectively engage one of said locking means,
   (g) one portion of said fork members including said projection means coaxially secured to said securing means,
   (h) each of said fork members being independently transversely adjustable on said securing means during selective engagement of said releasable rotatable projection means and said locking means,
   (i) said one portion further providing an extension portion extending upwardly and forwardly of said carrier,
   (j) separate motor means connected to said boom means and to said tractor loader;

(k) said linkage means further including separate motor means;

(l) said motor means being selectively operable to raise and lower said boom means, to extend and retract said linkage means to pivotally move said device about said boom means from a load engaging position to a load carrying position and to a load discharging position.

5. In a tractor loader including boom means and linkage means pivotally connected thereto and extending forwardly of said tractor loader, a load handling device comprising:

(a) a carrier providing a pair of side members connected in spaced-apart relation by a transverse extending member, (b) said carrier pivotally connected to said linkage means and to said boom means, (c) said transverse member further including securing means and a plurality of transverse locking means, (d) a pair of fork members, one portion of said fork members connected to said securing means in a transverse spaced-apart relation, (e) said one portion providing rotatable projection means to selectively engage one of said locking means, (f) each of said fork members being independently transversely adjustable on said securing means during selective engagement of said projection means and said locking means, (g) said one portion further providing an extension portion extending upwardly and forwardly of said carrier, (h) separate motor means connected to said boom means and said tractor loader;

(i) said linkage means further including separate motor means;

(j) said motor means being selectively operable to raise and lower said boom means, to extend and retract said linkage means to pivotally move said device about said boom means from a load engaging position to a load carrying position and to a load discharging position.

6. In a tractor loader including boom means and linkage means pivotally connected thereto and extending forwardly of said tractor loader, a load handling device comprising:

(a) a carrier providing a pair of side members connected in spaced-apart relation by a transverse extending member, (b) said carrier being pivotally connected to said linkage means and to said boom means, (c) a pair of fork members, (d) one part of said carrier providing a spaced plurality of openings transversely along said transverse member, (e) another part of said carrier providing first and second securing means, (f) a fastener means, (g) one portion of said fork members secured to said first securing means and lockingly clamped to at least one of said transverse openings through said fastener means engaging said one portion and one of said openings, (h) each of said fork members independently transversely adjustable on said first securing means before each of said fork members are lockingly clamped by said fastener means, (i) an extension portion extending upwardly and forwardly of said fork members, said extension portion secured to said first securing means to overlappingly engage said fork member one portion thereon, said extension portion secured to said second securing means, (j) a grab arm pivotally connected intermediate the ends thereof to said extension portion;

(k) separate motor means connected to said grab arm and said extension portion, and to said boom means and to said tractor loader;

(l) said linkage means further including separate motor means;

(m) said motor means being selectively operable to raise and lower said boom means, to extend and retract said linkage means to pivotally move said device about said boom means from a load engaging position to a load carrying position and to a load discharging position, and to pivotally move said grab arm about said extension portion from a load securing position to a load releasing position.

7. In a tractor loader including boom means and linkage means pivotally connected thereto and extending forwardly of said tractor loader, a load handling device comprising:

(a) a carrier providing a pair of side members connected in spaced-apart relation by a transverse extending member, (b) said carrier being pivotally connected to said linkage means and to said boom means, (c) a pair of fork members, (d) one part of said carrier providing a spaced plurality of openings transversely along said transverse member, (e) another part of said carrier providing first and second securing means, (f) a fastener means, (g) one portion of said fork members secured to said first securing means and lockingly clamped to at least one of said transverse openings through said fastener means engaging said one portion and one of said openings, (h) each of said fork members independently transversely adjustable on said first securing means before each of said fork members are lockingly clamped by said fastener means, (i) a removable extension portion extending upwardly and forwardly of said fork members, said extension portion secured to said first securing means to overlappingly engage said fork member one portion thereon, said extension portion secured to said second securing means, (j) separate motor means connected to said boom means and to said tractor loader;

(k) said linkage means further including separate motor means;

(l) said motor means being selectively operable to raise and lower said boom means, to extend and retract said linkage means to pivotally move said device about said boom means from a load engaging position to a load carrying position and to a load discharging position.

8. In a tractor loader including boom means and linkage means pivotally connected thereto and extending forwardly of said tractor loader, a load handling device comprising:

(a) a carrier providing a pair of side members connected in spaced-apart relation by a transverse extending member, (b) said carrier being pivotally connected to said linkage means and to said boom means, (c) a pair of fork members, (d) one part of said carrier providing a spaced plurality of openings transversely along said transverse member, (e) another part of said carrier providing securing means, (f) a fastener means, (g) one portion of said fork members secured to said securing means and lockingly clamped to at least one of said transverse openings through said fastener means engaging said one portion and one of said openings, (h) each of said fork members independently transversely adjustable on said securing means before each of said fork members are lockingly clamped by said fastener means, (i) a removable extension portion extending upwardly and forwardly of said fork members, said extension portion connected to said securing means, (j) separate motor means connected to said boom means and to said tractor loader;

(k) said linkage means further including separate motor means;

(l) said motor means being selectively operable to raise and lower said boom means, to extend and retract said linkage means to pivotally move said device about said boom means from a load engaging position to a load carrying position and to a load discharging position.

9. In a tractor loader including boom means and linkage means pivotally connected thereto and extending forwardly of said tractor loader, a load handling device comprising:

(a) a carrier including a transversely extending carrier member, said carrier being pivotally connected to said boom means and to said linkage means, (b) a pair of fork members, (c) an extension on each said fork members extending upwardly with respect to said carrier, (d) means connecting said fork members to said carrier including transversely extending supporting means carried on said carrier, (e) each extension including a slidable member embracing said supporting means whereby said fork members may be adjusted transversely to a plurality of positions on said supporting member, (f) securing means releasably connecting said carrier and said fork members in said positions, (g) a grab arm pivotally connected to each said extension portion, (h) actuating means connected to each said grab arm to pivot the same to load securing and releasing positions, (i) fluid actuated means on said loader connected to said boom arms for raising and lowering said carrier, (j) and second fluid actuated means connected to said linkage means for pivoting said carrier on said boom arms to a plurality of working positions.

10. In a tractor loader, a load handling device in accordance with claim 9, said supporting means including rod means extending transversely with said carrier member and substantially adjacent an upper portion thereof.

11. In a tractor loader, a load handling device in accordance with claim 10, including first locking elements carried on said rod means and movable transversely with said fork members, and second locking elements on said carrier engageable by said first locking elements for locking said fork members in said plurality of positions.

12. In a tractor loader including boom means and linkage means pivotally connected thereto and extending forwardly of said tractor loader, a load handling device comprising:

(a) a carrier providing a pair of side members connected in spaced-apart relation by a transverse extending member, (b) said carrier being pivotally connected to said linkage means and to said boom means, (c) a pair of fork members, (d) securing means releasably connecting said carrier and said fork members, (e) a removable extension extending upwardly and forwardly of said fork members, said extension being connected to said securing means, (f) each of said fork members independently transversely adjustable on said securing means, (g) separate motor means connected to said boom means and to said tractor loader, (h) said linkage means further including separate motor means, (i) said motor means being selectively operable to raise and lower said boom means, to extend and retract said linkage means to pivotally move said device about said boom means from a load engaging position to a load carrying position and to a load discharging position.

References Cited by the Examiner

UNITED STATES PATENTS

| 2,418,251 | 4/47 | Drott | 214—147 X |
|---|---|---|---|
| 2,483,745 | 10/49 | Vossenberg | 214—731 |
| 2,668,602 | 2/54 | Cushman | 214—731 |
| 2,752,054 | 6/56 | Thompson. | |
| 2,776,768 | 1/57 | Carlson | 214—147 |
| 2,997,193 | 8/61 | Dunham | 214—147 X |
| 3,010,595 | 11/61 | Stone | 214—731 X |
| 3,027,033 | 3/62 | Schuster | 214—731 X |
| 3,034,820 | 5/62 | Schwartz et al. | 214—147 X |

HUGO O. SCHULZ, *Primary Examiner.*